United States Patent [19]
Sewell

[11] Patent Number: 5,394,623
[45] Date of Patent: Mar. 7, 1995

[54] FLUIDIZED BED COFFEE ROASTER

[76] Inventor: Richard C. Sewell, 3201 Haggerty Rd., Walled Lake, Mich. 48390

[21] Appl. No.: 134,661

[22] Filed: Oct. 12, 1993

[51] Int. Cl.⁶ ............................................ F26B 21/06
[52] U.S. Cl. ...................................... 34/544; 34/494; 34/576; 99/286
[58] Field of Search ............... 34/57 R, 57 A, 62, 67, 34/359, 360, 372, 576, 428, 391, 368, 393, 493, 494, 544, 576, 549, 555; 99/286

[56] References Cited

U.S. PATENT DOCUMENTS

| | | | |
|---|---|---|---|
| 3,964,175 | 6/1976 | Sivetz | 34/57 A |
| 4,271,603 | 6/1981 | Moore, III | 99/286 |
| 4,326,114 | 4/1982 | Gerling et al. | 219/10.55 A |
| 4,484,064 | 11/1984 | Murray | 219/400 |
| 4,642,906 | 2/1987 | Kaatze et al. | 34/56 |
| 4,698,916 | 10/1987 | Färber | 34/57 A |
| 4,988,590 | 1/1991 | Price et al. | 426/595 |
| 5,185,171 | 2/1993 | Bersten | 426/467 |

OTHER PUBLICATIONS

"Engineering Air–Apouted Coffee Bean Beds for Drying/Roasting and Cooling with Color/Flavor Controls", M. Sivetz; AIChE–CoFe, Feb., 1993.
Brochure, Sivetz Coffee Inc., dated Jun. 1992.

Primary Examiner—Denise L. Gromada
Attorney, Agent, or Firm—Gifford, Krass, Groh, Sprinkle, Patmore, Anderson & Citkowski

[57] ABSTRACT

A self controlled, fluidized bed coffee roaster which provides a stream of heated air to a bed of coffee beans, monitors the temperature of the air that has passed through the bean; and when the air temperatures reaches a predetermined set point, a controller terminates the heating, deactivates the heater and injects water into the air stream at a point upstream of the beans to cool the system and quench the roasting process.

11 Claims, 2 Drawing Sheets

FLUIDIZED BED COFFEE ROASTER

FIELD OF THE INVENTION

This invention relates to devices for roasting coffee, nuts, grains and other such materials. More specifically, the invention relates to a fluidized bed roaster in which the items being roasted are at least partially suspended in a stream of heated air. Most specifically, the invention relates to a self-contained, fully automated coffee roasting apparatus.

BACKGROUND OF THE INVENTION

Coffee is a beverage with global and growing appeal, and there is an ever-increasing demand for high quality coffee. As is well known, coffee beans must be roasted prior to brewing. Roasting causes a complex series of chemical changes in the beans wherein sugars and/or other organic compounds are pyrolized, various volatiles are released and complex flavor elements are generated. The roasting process must be very carefully controlled, both in terms of time and temperature. Under-roasted coffee produces a thin, latex-flavored, bitter beverage, while over-roasted coffee is oily and burnt tasting. Prolonged roasting, even at an appropriate temperature, volatilizes many of the flavor elements and produces a beverage of little taste. Roasting is further complicated by the fact that some of the reactions occurring during the roasting are exothermic, and as a consequence, the beans can readily become overheated. It will therefore be appreciated that roasting is a very complicated process, typically carried out by trained personnel.

One standard roasting technique in the prior art comprises tumbling the coffee beans in a heated drum. While the hardware for the process is relatively simple, control is difficult, and it is very easy to scorch, and ruin the beans. Furthermore, smoke and oils generated in the process remain in contact with the beans and can confer a disagreeable taste. As a consequence, the industry is turning to the use of fluidized bed roasters. In systems of this type, the coffee beans are at least partially levitated by a stream of heated air, and the degree of roasting is controlled by controlling the temperature of the air and the duration of the heating cycle. While fluidized bed roasters eliminate problems of contamination by smoke and oils, care must still be taken to avoid scorching the beans. Toward this end, prior art fluidized bed roasting systems typically include some provision for quenching the beans after they are roasted, as for example by an introduction of a stream of cool air or by spraying the beans with water. U.S. Pat. No. 4,484,064 discloses a fluidized bed coffee roaster in which ambient air is used for cooling. A somewhat similar system is disclosed in U.S. Pat. No. 5,185,171. U.S. Pat. No. 3,964,175 discloses the use of a water spray to cool the beans.

It has been found that various flavor elements of roasted coffee dissipate quickly after the roasting process is complete. In an attempt to preserve the flavor of fresh roast coffee, the beans are vacuumed sealed, frozen, or enclosed in air tight containers for storage. Generally, because of the complexity of the coffee roasting process and the size and expense of the associated equipment it has not been practical to roast relatively small amounts of coffee at the point of purchase. However, it will be appreciated that in view of the superior flavor of fresh roasted coffee and the associated marketing value thereof, it would be desirable to have the coffee roasting apparatus which is relatively low in cost, simple to use and capable of quickly and precisely roasting a consumer sized amount of coffee beans.

As will be described in detail hereinbelow, the present invention provides a fluidized bed coffee roaster which is safe, fully automated in its operation and hence, operable by untrained personnel. The roaster may be charged with beans, set into operation, and left to run. The beans are automatically roasted to an appropriate degree, after which they are quickly cooled, thereby precluding the need to promptly remove them from the roasting chamber. These and other advantages of the present invention will be readily apparent from the drawings, discussion and description which follow.

BRIEF DESCRIPTION OF THE INVENTION

There is disclosed herein a fluidized bed roaster for coffee, nuts, grains and other such seeds. The roaster comprises a roasting chamber including an air permeable member configured to support a volume of seeds thereupon, an air inlet disposed so as to introduce the stream of air into the chamber through the permeable member so that the airstream passes through, and fluidized the volume of seeds, and an air outlet disposed so as to direct the stream of air out of the chamber. The roaster further includes a blower operable to provide the stream of air and an air duct operatively connecting the blower with the air inlet of the chamber. The roaster includes a heater associated with the air duct at a point which is downstream of the blower and upstream of the chamber. The heater, when activated is operable to heat the airstream as it passes through the air duct. The heater has a controller associated therewith which is operable to control its activation so that the stream of air may be heated in accord with a preselected temperature profile. The apparatus further includes a roast temperature sensor disposed proximate the outlet of the roasting chamber. The roast temperature sensor operates to provide a roast control signal which corresponds to the temperature of the stream of air after it has passed through the volume of seeds. The roaster also includes a water injector, operable when activated, to inject water into the air conduit at a point upstream of the roast chamber and further includes a roast controller which is in operative communication with the roast temperature sensor, the heater and the water injector. The roast controller operates to deactivate the heater and activate the water injector when a preselected roast temperature is reached.

The roaster may further include an airstream temperature sensor disposed in the conduit, between the heater and the roast chamber. In some embodiments, the air temperature sensor is in communication with the heater controller. The heater controller may include a silicon controlled rectifier and in some embodiments, may operate to control the heater so that the temperature of the stream of air initially rises at a fairly high rate and subsequently rises at a lower rate.

The roaster may include an over-temperature detector which shuts the system down if an extreme temperature condition, as for example that occasioned by a fire, is detected. In one specific embodiment, the over-temperature detector triggers a water inlet which dispenses a stream of water into the roasting chamber. The system may include a separator associated with the roast chamber outlet for removing chaff and other fine particulate material from the exiting airstream. The system may also include a roast temperature input for specifying, to the roast controller, the preselected temperature at which the roasting process should be terminated.

DETAILED DESCRIPTION OF THE INVENTION

Figure 1:
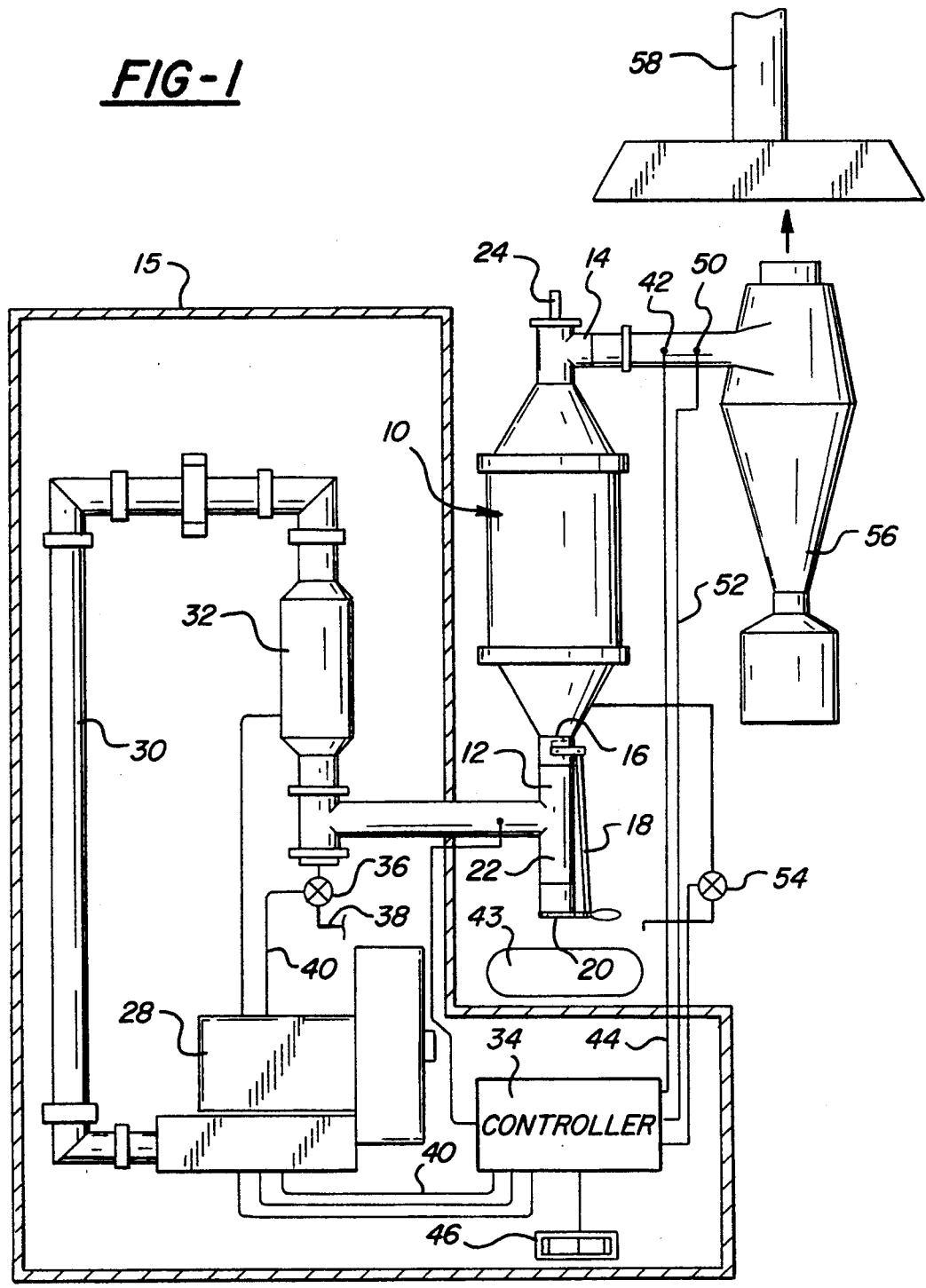
FIG. 1 is a schematic view of one embodiment of coffee bean roaster structured in accord with principles of the present invention.

The present invention is directed to a fluidized bed roaster for coffee beans and the like. The roaster of the present invention may be operated by untrained personnel since the operator need not monitor the roasting process. Referring now to FIG. 1, there is shown a schematic depiction of a generalized apparatus structured in accord with the principles of the present invention. The roaster includes a roasting chamber 10 which retains the coffee beans during the roasting process. The roasting chamber 10 includes an inlet 12 for introducing a stream of air into the chamber and an outlet 14 for permitting the stream to exit. The chamber also includes a perforated plate or screen which is permeable to the airstream and which supports a volume of coffee beans thereupon. In the illustration, a portion of the housing of the roasting chamber 10 is cut away to show the perforated plate 16. It will be noted that the perforated plate 16 is hingedly connected to a lever 18 which is further connected to a bottom closure member 20 which seals a bottom outlet 22 of the roasting chamber 10. It will also be noted that the chamber 10 includes a fill cap 24 which closes the top end thereof. In a most preferred embodiment, at least the central, cylindrical portion 26 of the roasting chamber 10 is fabricated from a transparent material, preferably borosilicate glass or a high temperature polymer, so as to permit viewing of the beans while they roast. While the automated control of the roaster of the present invention eliminates the need for any visual inspection of the beans during roasting, it has been found that potential customers are attracted to the sight of the roasting beans, and this feature is an important marketing tool.

The system includes an air conduit 30 which communicates with the inlet 12 of the chamber 10. The conduit 30 is also in communication with a blower 28 and serves to direct a flow of air from the blower 28 into and through the chamber 10. Interposed downstream of the blower 28 and upstream of the chamber 10 is a heater 32 which heats the air passing through the conduit. The heater 32 is operatively connected to a controller 34 which selectively activates the heater 32 so as to provide a controlled temperature profile to the heated air provided to the roasting chamber 10.

The system further includes a water injection solenoid value 36, operatively connected via a supply line 38 to a source of water, such as a water main, not shown. This water injection solenoid valve 36 is in electrical communication with the controller via a control line 40.

The controller 34 is also in electrical communication with a roast temperature sensor 42 which is disposed proximate the outlet 14 of the roast chamber 10. The roast temperature sensor 42 measures the temperature of the air which has passed through the volume of coffee beans and provides a control signal which is sensed by the controller 34 via control line 44.

In operation, a charge of coffee beans is placed into the roasting chamber 10 through the fill cap 24. The system is activated via a master switch 46 in communication with the controller 34. The controller activates the blower 28 so as to provide a stream of air which is directed through the conduit 30 to the roasting chamber 10. Once the air is flowing, the controller activates the heater (via an in line pressure switch) 32 so as to begin providing heated air to the chamber 10. As noted hereinabove, it is desirable that the heater be operated so as to control the time-temperature profile of the air. It has been found that if intense heat is applied to the beans too suddenly, the exterior of the beans may be over heated and burnt before sufficient temperature has been conducted to roast the interior of the bean, hence it is generally desirable that the controller activate the heater so as to provide a profiled application of heat. Activation may be in accord with a preset sequence resident in the controller or it may be further accomplished through the use of an air temperature sensor 48 which is in communication with the controller and which is disposed in the conduit 30 at a point downstream of the heater 32 and upstream of the roasting chamber 10.

Figure 2:
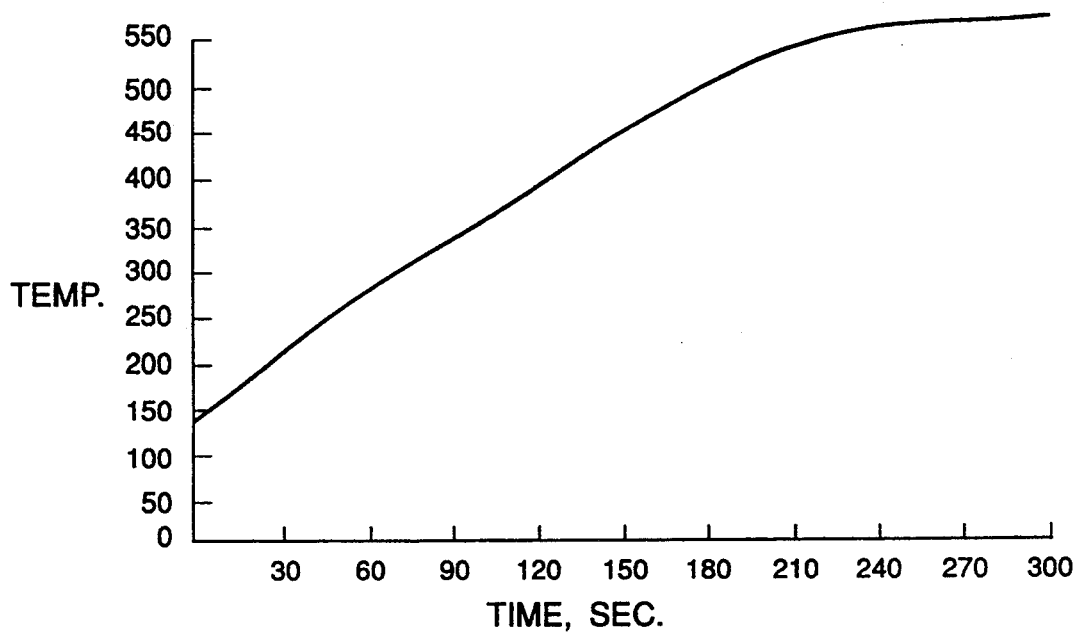
FIG. 2 is a graph depicting one particular temperature profile employed in the present invention.

Referring now to FIG. 2, there is shown one time temperature profile which has been found to have utility in the present invention. The graph depicts air temperature in the conduit, at a point corresponding to the temperature sensor 48 of FIG. 1 and depicts this temperature as a function of cycle time. It will be noted that the air is initially at an ambient temperature of approximately 70°. The air temperature at first rises at a fairly rapid rate for approximately three minutes to approximately 400° F. During the next four minutes, the temperature rises much more gradually (via a predetermined profile) from 400° to approximately 540° F. It has been found that a profiled rise of this general type precludes exterior charring of the beans. It is to be understood that depending upon air flow, dimensions of the roasting chamber and other such parameters, other profiles may be found advantageous.

In the operational cycle, the heated air flows through the inlet 12 and the perforated plate 16 and at least partially levitates the coffee beans into a fluidized bed. The temperature of the air exiting the chamber is measured by a roast sensor 42 and when a preselected temperature is reached, roasting of the beans is completed. The specific temperature will depend upon the weight of beans being roasted, the darkness of the roast desired as well as the particular parameters of the specific roasting system such as air inlet temperature, heater capacity, system size and the like. In one particular system it has been found that with an air inlet temperature of 540°, profiled as described hereinabove, a medium roast of a one to two pound charge of coffee, is complete when a roast temperature sensor measures a temperature of approximately 450° at the outlet.

The controller 34 is in communication with the roast temperature sensor 42, and when a preselected roast temperature is achieved, the controller deactivates the heater 32 and initiates injection of water through the solenoid valve 36. The blower 28 is maintained in operation at this time. The injected water quickly turns to steam, and in so doing cools the air stream and the conduit 30. The steam passes through the beans in the roast chamber and exits through the outlet 14 thereof. It has been found that the steam humidifies and stabilizes the beans to some degree while cooling them. Injection of water at the upstream location avoids problems occasioned by the direct application of quenching water to the beans. It has been found preferable to activate the water injected 36 in an on-off cycle so as to provide maximum and rapid cooling. One preferred cycle comprises six repetitions of a sequence of one second of water injection followed by one second of air flow only. After injection of the water, the blower is allowed to run for an additional short period of time, typically one to two minutes to further cool the beans. After the roast cycle is done, the beans are removed from the roast chamber by activating lever 18 which opens the outlet plate 20 from the roast chamber 10 and also tilts the perforated plate 16, so as to permit the beans to be collected, as for example, in the bean collector tray 43. As noted above, the steam based cool down cycle quickly quenches the beans and cools the roaster; therefore, the beans may be left in the roaster, if desired, without danger of overroasting.

As illustrated in FIG. 1, the basic system may include further refinements. For example, the system may include an over temperature sensor 50, shown here for example, in the outlet stream. The over temperature sensor functions to detect an emergency situation resultant from a fire in the roasting chamber or other such malfunction. The over temperature sensor 50 is in operative communication with the controller via a control line 52. Should an over temperature condition be detected, the controller 34 immediately deactivates the heater 32 and blower 28. The controller 34 may also activate the water injector 36 as well as a fire control water inlet 54 which floods the roasting chamber 10 thereby extinguishing any fire which may occur. As illustrated in FIG. 1, the system may include a cabinet 15, which houses the blower 28, controller 34, heater 32, and associated portions of the conduit 30.

Other ancillary equipment to the system may include a separator 56, such as a cyclonic separator which operates to collect the chaff generated during the roasting of coffee. The system may also include a vent hood 58 for exhausting heated air from the vicinity of the roaster.

Figure 3:
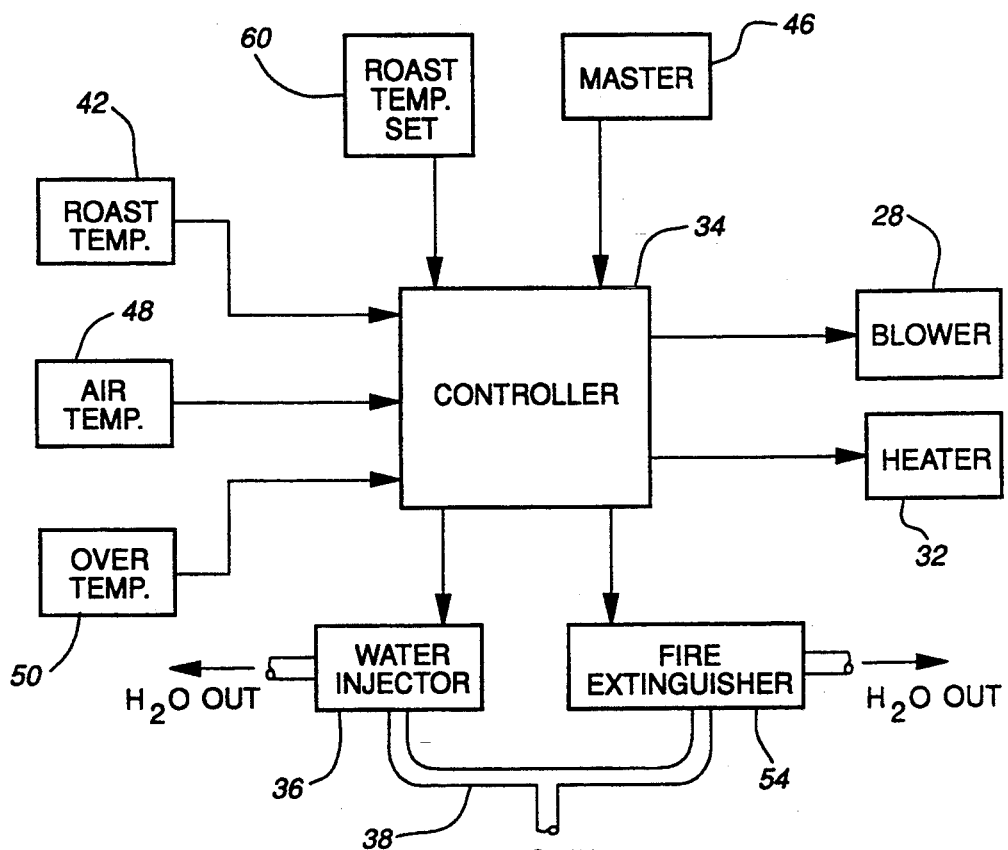
FIG. 3 is a block diagram of one embodiment of the present invention.

Referring now to FIG. 3, there is shown a block diagram of a typical system structured in accord with the present invention. Shown is a controller 34 which is disposed to receive signals from a roast temperature sensor 42, an air temperature sensor 48 and an over temperature sensor 50. The controller also is in communication with a master switch 46 for activation of the system as well as a roast temperature set switch 60. The roast temperature set switch programs a preselected roast temperature into the controller so that the controller may activate the cool down sequence, as noted above, when the preselected roast temperature is measured by the roast temperature sensor 42. In some embodiments, the roast temperature set switch 60 is dispensed with, and an optimized roast temperature is preprogrammed into the controller; but for other applications, it may be desirable to specify a particular roast temperature. As noted above, in this manner the degree of roasting may be controlled to provide a light, medium or dark roast. Also, in some instances large volumes of beans will require somewhat lower final roast temperature as compared to a smaller volume of beans, to achieve an equivalent roast, because of higher back pressure in the roast chamber.

The controller 34 is in turn in communication with the blower 28, heater 32, water injector 36 and fire extinguisher 54 as noted above. It is to be understood that the controller 34 may comprise a single microprocessor based unit, or the controller may be a distributed control system comprised of a number of units which separately monitors and responds to various parameters such as the roast temperature, heater profile and over temperature condition. All of these variations are within the scope of the present invention.

In view of the foregoing, it will be appreciated that the invention may be practiced in a variety of configurations. The principles hereof may be adapted to very large volume roasters as well as relatively small systems for consumer use or point of purchase roasting. One particularly preferred system adapted for point of purchase roasting is operative to roast between 0.5 and 5 pounds of coffee at a time. The system includes a glass tube based roasting chamber. A particularly preferred heater comprises a high wattage, low volume heater which is configured to surround a portion of the air conduit. Heaters of this type are efficient and have a relatively small thermal mass, and hence provide for rapid heating and cooling. One preferred heater is sold under the trade name Superserp X ® by the GTE Corporation, and it has been found that the 10,000 watt, 240 volt, one phase model provides good performance in the afore-described system. This heater is preferably controlled via an SCR power controller. Such controllers are staple items of commerce and are available, for example, from the Avatar Instrument Co. of Norristown, Pa. There are a variety of blowers which may be employed in the present invention. One preferred blower is that sold by the Spencer Turbine Co. of Windsor, Conn. under the designation VB-007S-E Vortex blower. The temperature sensors are preferably thermocouples or thermistors, as is well known in the art. As noted above, the controller may comprise a single microprocessor based controller, or it may a distributed system. There are available in the market, a number of systems for controlling heaters, blowers and other heavy loads in response to thermocouple or thermistor input. One source of such controllers is the Watlow Corporation of Winona, Minn.

It will be appreciated from the foregoing, that the system of the present invention will be implemented in a variety of configurations. Therefore, it is to be understood that the foregoing drawings, discussion and description are merely meant to illustrate particular embodiments of the invention, and are not meant to be limitations upon the practice thereof. It is the following claims, including all equivalents, which define the scope of the invention.

I claim:

1. A fluidized bed seed roaster comprising:
   a roasting chamber including an air-permeable member configured to support a volume of seeds thereupon; an air inlet disposed so as to introduce a stream of air into said chamber, through said permeable member, so as to pass through and fluidize said volume of seeds; and an air outlet disposed so as to direct said stream of air out of the chamber after it has passed through the volume of seeds:
   a blower operable to provide said stream of air;
   an air duct operatively connecting said blower with the air inlet of the chamber so as to direct the stream of air from the blower to the inlet;

a heater associated with the air duct at a point downstream of the blower and upstream of the roasting chamber, said heater, when activated, being operable to heat the stream of air;

a heater controller operative to control the activation of the heater so as to heat the stream of air in accord with a preselected temperature profile;

a roast temperature sensor disposed proximate the outlet of the roasting chamber, said sensor operative to provide a roast control signal corresponding to the temperature of the stream of air after it has passed through the volume of seeds;

a water injector, operable when activated, to inject water into the air conduit at a point upstream of the roasting chamber so as to cool the stream of air before it passes through said volume of seeds; and a roast controller in operative communication with the roast temperature sensor, the heater and water injector, said roast controller operable to deactivate the heater and activate the water injector when it receives a roast control signal indicative of a preselected air stream temperature.

2. A roaster as in claim 1, further including an air stream temperature sensor disposed in the conduit at a point upstream of the roasting chamber and downstream of the heater, said air stream temperature sensor operative to provide a second control signal corresponding to the temperature of the stream of air upstream of the roasting chamber.

3. A roaster as in claim 2, wherein the heater controller is in operative communication with the air stream temperature sensor and wherein said heater controller activates the heater in response to the second control signal.

4. A roaster as in claim 1, wherein said heater controller includes a silicon controlled rectifier.

5. A roaster as in claim 1, wherein said heater controller is operative to control the activation of the heater so that the temperature of the stream of air initially rises at a first, relatively rapid rate, and subsequently rises at a second, relatively low rate.

6. A roaster as in claim 1, wherein said roast controller activates the water injector in a pulsed on and off mode.

7. A roaster as in claim 1, further including an over temperature detector operative to determine if an extreme temperature condition exists in the roasting chamber.

8. A roaster as in claim 7, wherein said over temperature detector is further operative to shut off the blower and deactivate the heater if an extreme temperature condition is detected.

9. A roaster as in claim 8 further including a water inlet disposed so as to introduce a stream of water into the roasting chamber when activated; wherein said over temperature detector is further operative to activate the water inlet when an extreme temperature condition is detected.

10. A roaster as in claim 1 further including a separator in communication with the outlet, said separator operative to remove solid particulate matter from the air stream.

11. A roaster as in claim 1, further including an input device in communication with the roast controller, said input device operative to input said preselected roast temperature to said controller.

* * * * *